United States Patent
Liao et al.

(10) Patent No.: US 11,859,663 B2
(45) Date of Patent: Jan. 2, 2024

(54) LINEAR GUIDEWAY, SLIDING MODULE THEREOF, AND CIRCULATION SEAT THEREOF

(71) Applicant: OME TECHNOLOGY CO., LTD., New Taipei (TW)

(72) Inventors: Kuo-Fu Liao, New Taipei (TW); Wen-Bin Wu, New Taipei (TW); Jo-Hsuan Chang, New Taipei (TW); Wei-Min Wang, New Taipei (TW); Jhih-Jie Luo, New Taipei (TW)

(73) Assignee: OME TECHNOLOGY CO., LTD., New Taipei (TW)

( * ) Notice: Subject to any disclaimer, the term of this patent is extended or adjusted under 35 U.S.C. 154(b) by 42 days.

(21) Appl. No.: 17/837,151

(22) Filed: Jun. 10, 2022

(65) Prior Publication Data
US 2023/0332642 A1      Oct. 19, 2023

(30) Foreign Application Priority Data
Apr. 15, 2022   (TW) .................................. 111114358

(51) Int. Cl.
*F16C 29/06*     (2006.01)
*F16C 29/08*     (2006.01)

(52) U.S. Cl.
CPC ........ *F16C 29/0607* (2013.01); *F16C 29/088* (2013.01)

(58) Field of Classification Search
CPC .. F16C 29/06; F16C 29/0602; F16C 29/0604; F16C 29/0607; F16C 29/0642; F16C 29/088
See application file for complete search history.

(56) References Cited

U.S. PATENT DOCUMENTS

| | | | |
|---|---|---|---|
| 7,862,236 B2* | 1/2011 | Chen ................... | F16C 29/0647 384/43 |
| 7,950,852 B2* | 5/2011 | Kondo ................. | F16C 29/065 384/15 |
| 9,068,601 B2* | 6/2015 | Mizumura .......... | F16C 29/0602 |
| 10,174,787 B2* | 1/2019 | Sakai ..................... | F16C 29/06 |

(Continued)

FOREIGN PATENT DOCUMENTS

| CN | 209444713 U | 9/2019 |
|---|---|---|
| JP | 2008240882 A | 10/2008 |

*Primary Examiner* — James Pilkington
(74) *Attorney, Agent, or Firm* — Li & Cai Intellectual Property (USA) Office

(57) ABSTRACT

A linear guideway, a sliding module thereof, and a circulation seat thereof are provided. The circulation seat has an inherently one-piece structure, which includes two turning portions, a middle retaining portion, and two lateral retaining portions. The middle retaining portion has a two-stepped structure, which includes a connection bar and a limiting bar that is connected to the connection bar. The connection bar is connected to and arranged between the two turning portions, and a distance between two long lateral surfaces of the connection bar gradually increases along a direction away from the limiting bar. The two lateral retaining portions are connected to and arranged between the two turning portions, and the two lateral retaining portions are respectively located at two opposite sides of the middle retaining portion.

9 Claims, 15 Drawing Sheets

(56) References Cited

U.S. PATENT DOCUMENTS

2007/0215245 A1* 9/2007 Lin .................... F16C 29/0635
144/251.1
2008/0292226 A1* 11/2008 Chen ................... F16C 29/0602
384/15

* cited by examiner

LINEAR GUIDEWAY, SLIDING MODULE THEREOF, AND CIRCULATION SEAT THEREOF

CROSS-REFERENCE TO RELATED PATENT APPLICATION

This application claims the benefit of priority to Taiwan Patent Application No. 111114358, filed on Apr. 15, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a guideway, and more particularly to a linear guideway, a sliding module thereof, and a circulation seat thereof.

BACKGROUND OF THE DISCLOSURE

In a conventional linear guideway, a middle retainer has assembling structures formed on two ends thereof, and the assembling structures may cause the middle retainer to have problems related to alignment accuracy requirements, assembling tolerances, and stress concentration from rotation.

SUMMARY OF THE DISCLOSURE

In response to the above-referenced technical inadequacies, the present disclosure provides a linear guideway, a sliding module thereof, and a circulation seat thereof to effectively improve on the issues associated with conventional linear guideways.

In one aspect, the present disclosure provides a linear guideway, which includes a track, a sliding module, and two end modules. The track has two lateral surfaces respectively arranged on two opposite sides thereof. The sliding module is slidably disposed on the track along a sliding direction. The sliding module includes a slider and two circulation seats. The slider has a base portion and two lateral wing portions that respectively extend from the base portion. Moreover, inner sides of the two lateral wing portions respectively face toward the two lateral surfaces. Each of the two circulation seats has an inherently one-piece structure. The two circulation seats are respectively assembled to the two lateral wing portions and respectively correspond in position to the two lateral surfaces. Each of the two circulation seats includes two turning portions, a middle retaining portion, and two lateral retaining portions. The two turning portions are respectively disposed on two end surfaces of the slider. The middle retaining portion has a two-stepped structure parallel to the sliding direction. The two-stepped structure includes a connection bar and a limiting bar that is connected to the connection bar. The connection bar is connected to and arranged between the two turning portions, and a distance between two long lateral surfaces of the connection bar gradually increases along a direction away from the limiting bar. The two lateral retaining portions are connected to and arranged between the two turning portions. The two lateral retaining portions are respectively located at two opposite sides of the middle retaining portion. The two end modules are respectively assembled to the two end surfaces of the slider. Each of the two end modules covers one of the two turning portions of each of the two circulation seats, and the two end modules are slidably disposed on the track.

In another aspect, the present disclosure provides a sliding module of a linear guideway, which includes a slider and two circulation seats. The slider has a base portion and two lateral wing portions that respectively extend from the base portion. Moreover, inner sides of the two lateral wing portions face toward each other. Each of the two circulation seats has an inherently one-piece structure. The two circulation seats are respectively assembled to the two lateral wing portions. Each of the two circulation seats includes two turning portions, a middle retaining portion, and two lateral retaining portions. The two turning portions are respectively disposed on two end surfaces of the slider. The middle retaining portion has a two-stepped structure. The two-stepped structure includes a connection bar and a limiting bar that is connected to the connection bar. The connection bar is connected to and arranged between the two turning portions, and a distance between two long lateral surfaces of the connection bar gradually increases along a direction away from the limiting bar. The two lateral retaining portions are connected to and arranged between the two turning portions. The two lateral retaining portions are respectively located at two opposite sides of the middle retaining portion.

In yet another aspect, the present disclosure provides a circulation seat of a linear guideway having an inherently one-piece structure. The circulation seat includes two turning portion, a middle retaining portion, and two lateral retaining portions. The middle retaining portion has a two-stepped structure. The two-stepped structure includes a connection bar and a limiting bar that is connected to the connection bar. The connection bar is connected to and arranged between the two turning portions, and a distance between two long lateral surfaces of the connection bar gradually increases along a direction away from the limiting bar. The two lateral retaining portions are connected to and arranged between the two turning portions. The two lateral retaining portions are respectively located at two opposite sides of the middle retaining portion.

Therefore, in any one of the linear guideway, the sliding module, and the circulation seat provided by the present disclosure, the circulation seat can be integrally formed as a single one-piece structure through the structural design of the middle retaining portion (e.g., the middle retaining portion is the two-stepped structure, and a distance between two long lateral surfaces of the connection bar gradually increases along a direction away from the limiting bar), thereby effectively avoiding problems associated with the middle retainer of the conventional linear guideway (e.g., problems related to alignment accuracy requirements, assembling tolerances, and stress concentration due to rotation).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
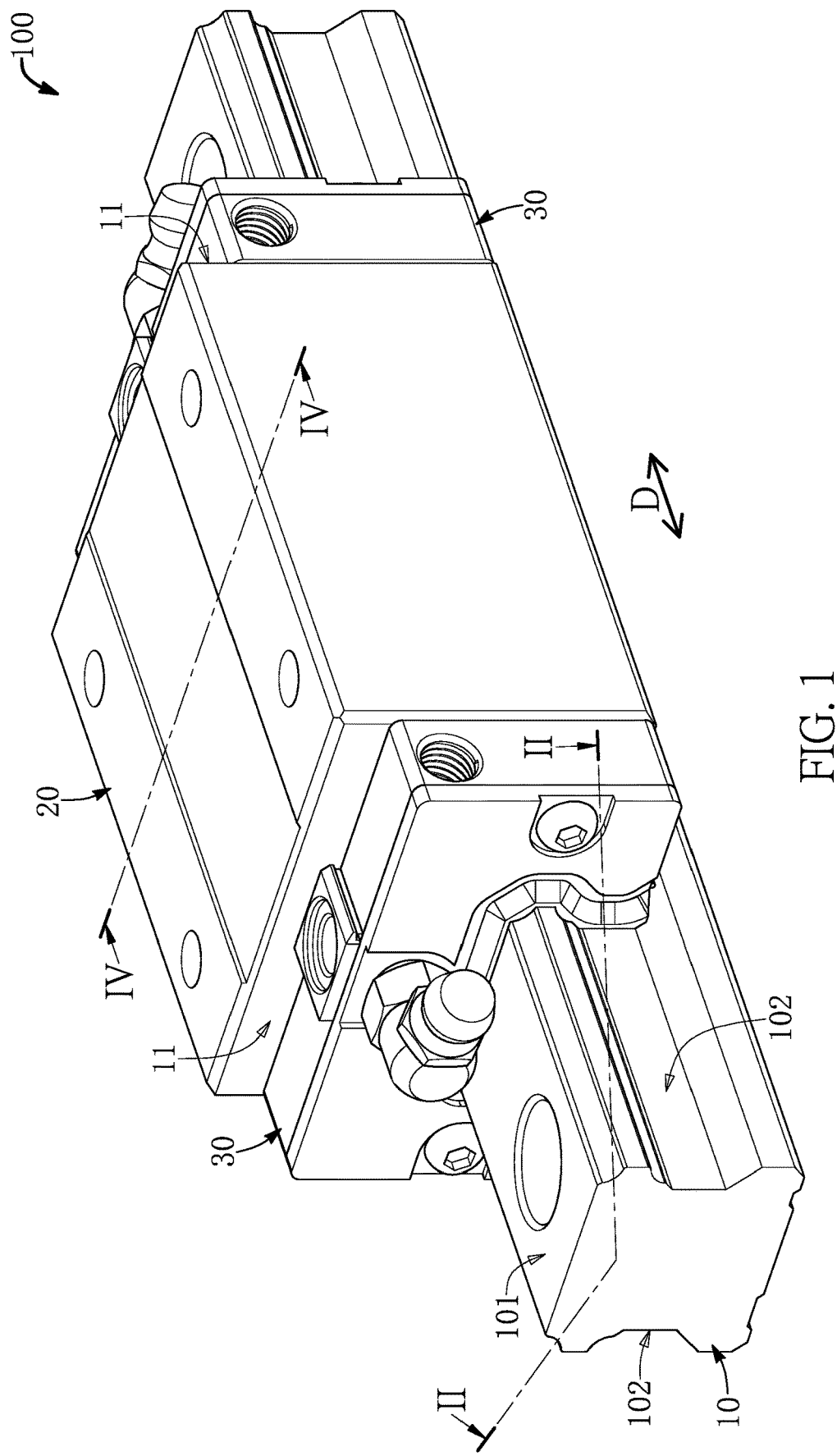
FIG. 1 is a perspective view of a linear guideway according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 15, an embodiment of the present disclosure provides a linear guideway 100. The linear guideway 100 in the following description is a standard linear guideway, but the present disclosure is not limited thereto. As shown in FIG. 1 to FIG. 5, the linear guideway 100 in the present embodiment includes a track 10 having an elongated shape, a sliding module 20 slidably disposed on the track 10 along a sliding direction D, and two end modules 30 that are respectively assembled to two opposite ends of the sliding module 20 and that are slidably disposed on the track 10.

It should be noted that the sliding module 20 in the present embodiment is described in cooperation with the track 10 and the two end modules 30, but the present disclosure is not limited thereto. For example, in other embodiments of the present disclosure not shown in the drawings, the sliding module 20 can be independently used (e.g., sold) or can be used in cooperation with other components.

Figure 2:
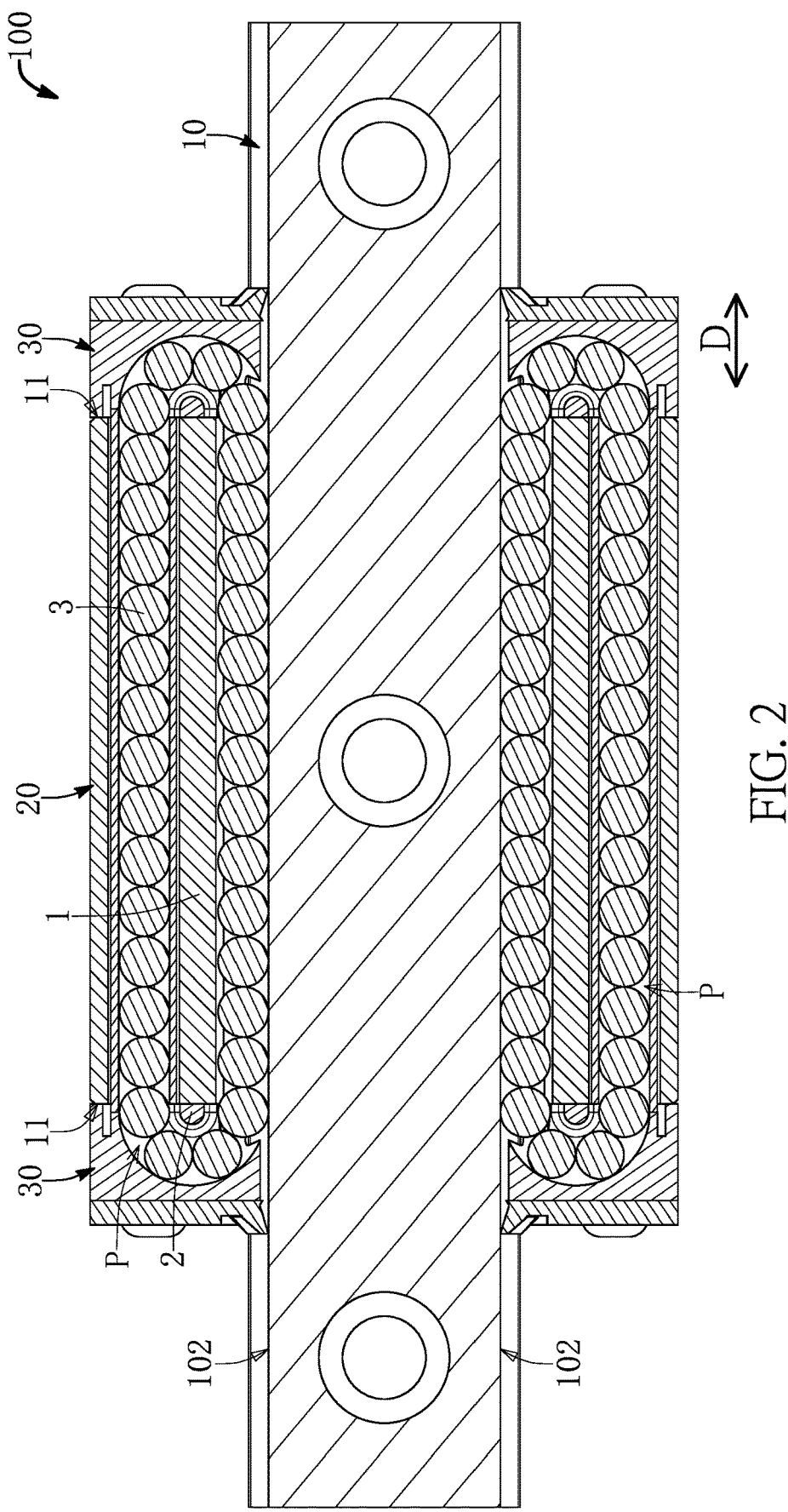
FIG. 2 is a cross-sectional view taken along line II-II of FIG. 1.
Figure 4:
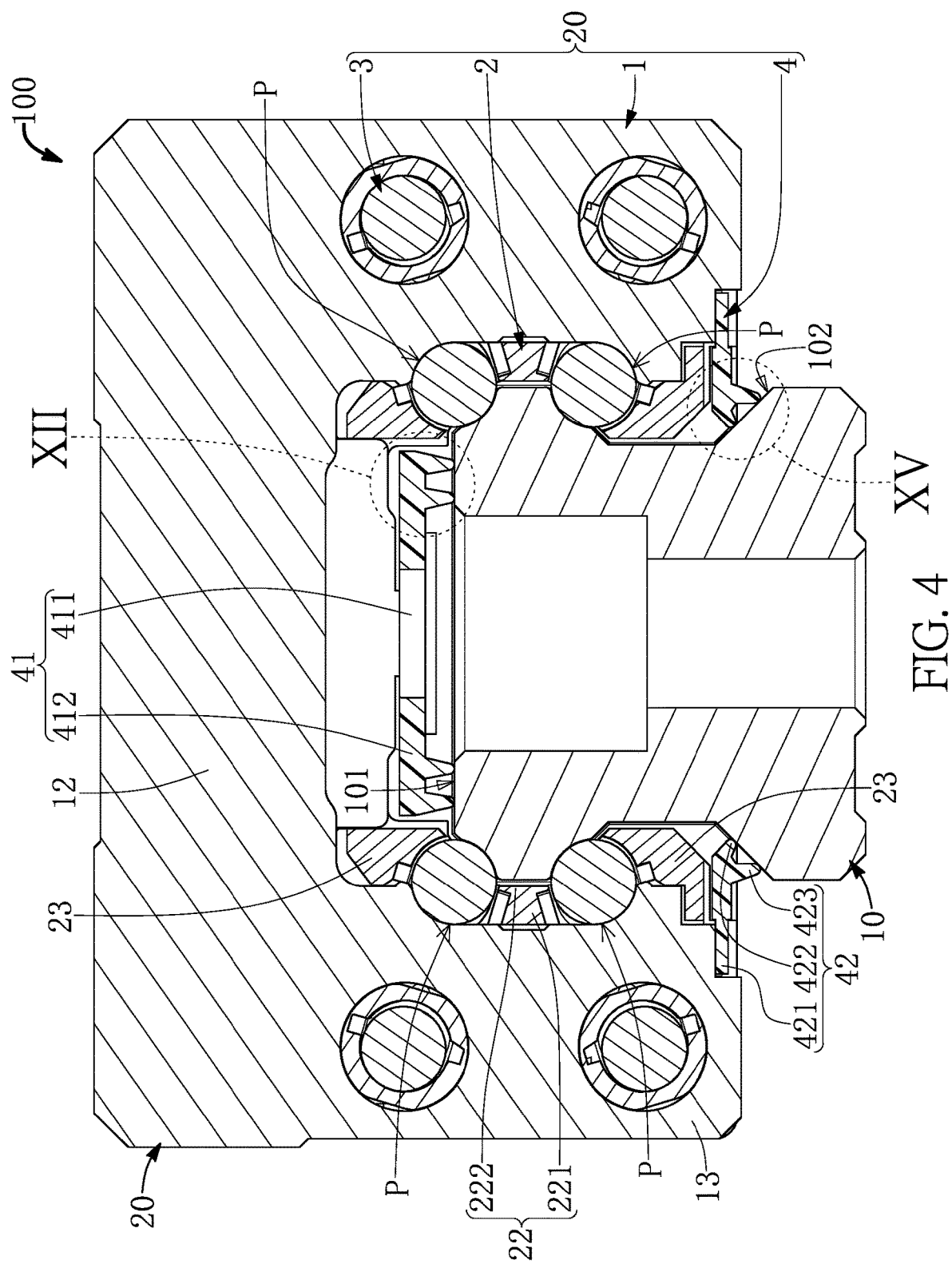
FIG. 4 is a cross-sectional view taken along line IV-IV of FIG. 1.
Figure 5:
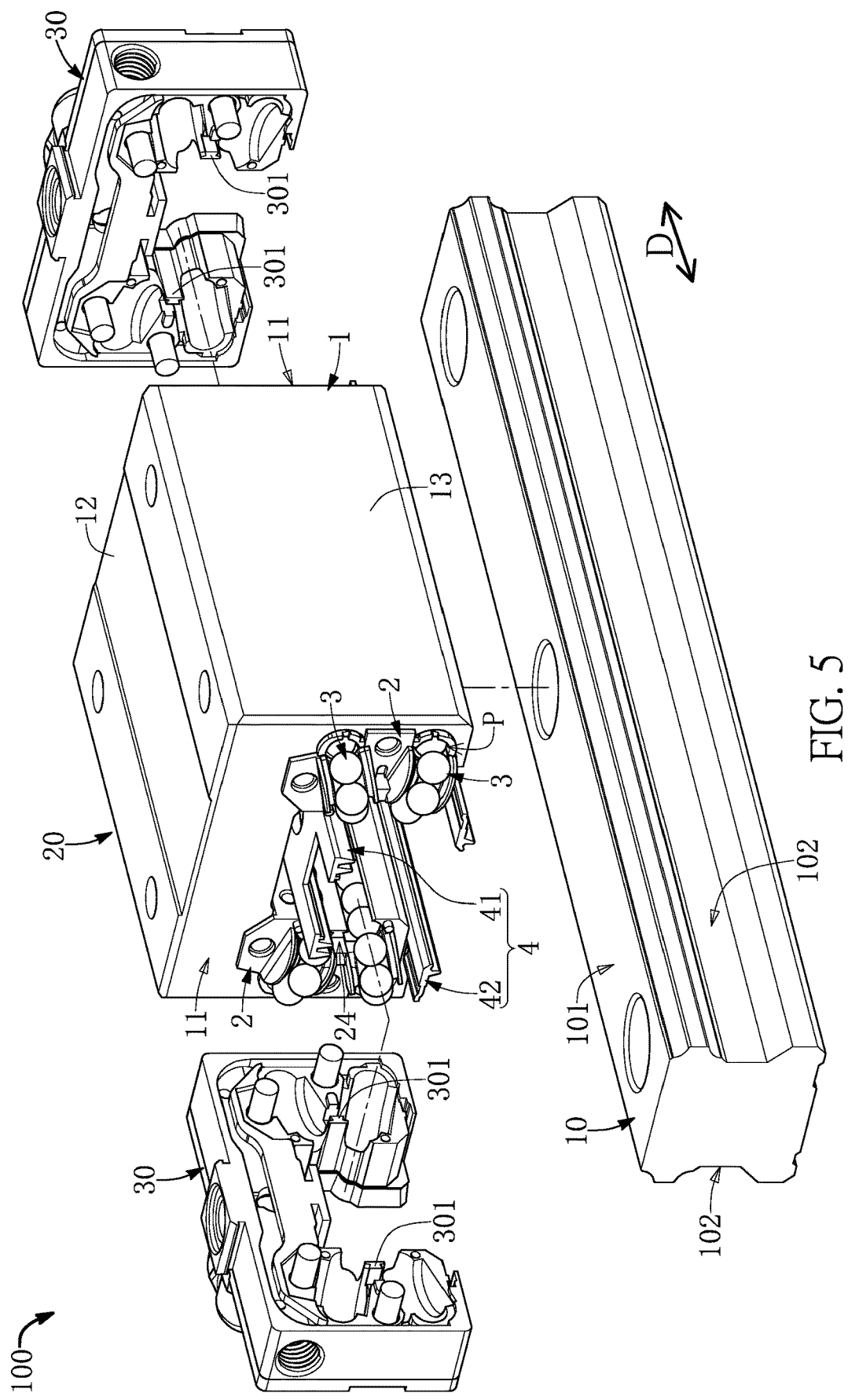
FIG. 5 is an exploded view of FIG. 1.

As shown in FIG. 2, FIG. 4, and FIG. 5, a longitudinal direction of the track 10 defines the sliding direction D, and the track 10 has an upper surface 101 and two lateral surfaces 102 that are arranged on two opposite sides thereof. In the present embodiment, the track 10 has a straight shape, and the upper surface 101 and the two lateral surfaces 102 are parallel to the sliding direction D, but the present disclosure is not limited thereto. For example, in other embodiments of the present disclosure not shown in the drawings, the track 10 can be curved.

Figure 6:
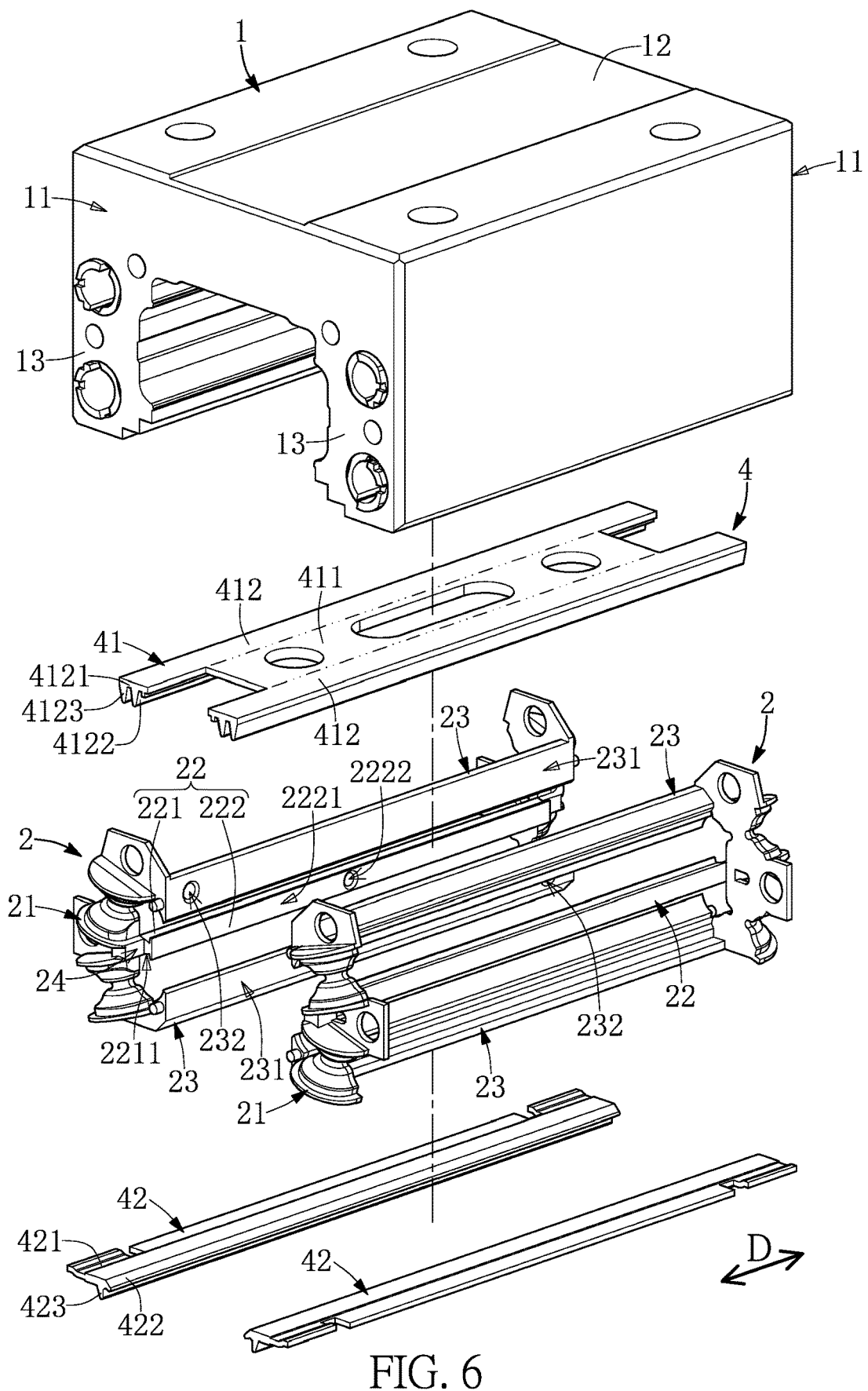
FIG. 6 is an exploded view showing a sliding module of FIG. 5.
Figure 7:
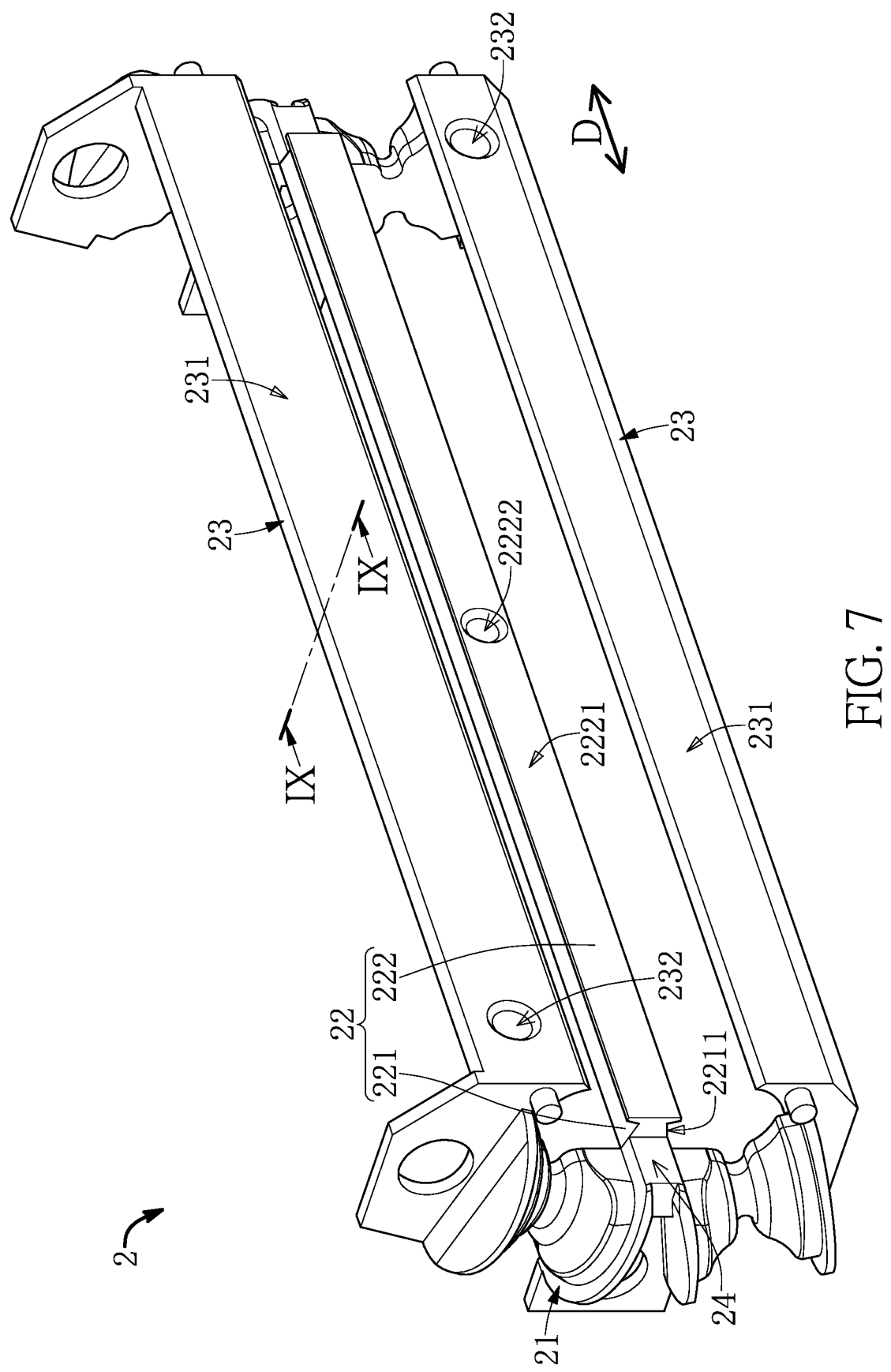
FIG. 7 is a perspective view showing a circulation seat of FIG. 6.
Figure 8:
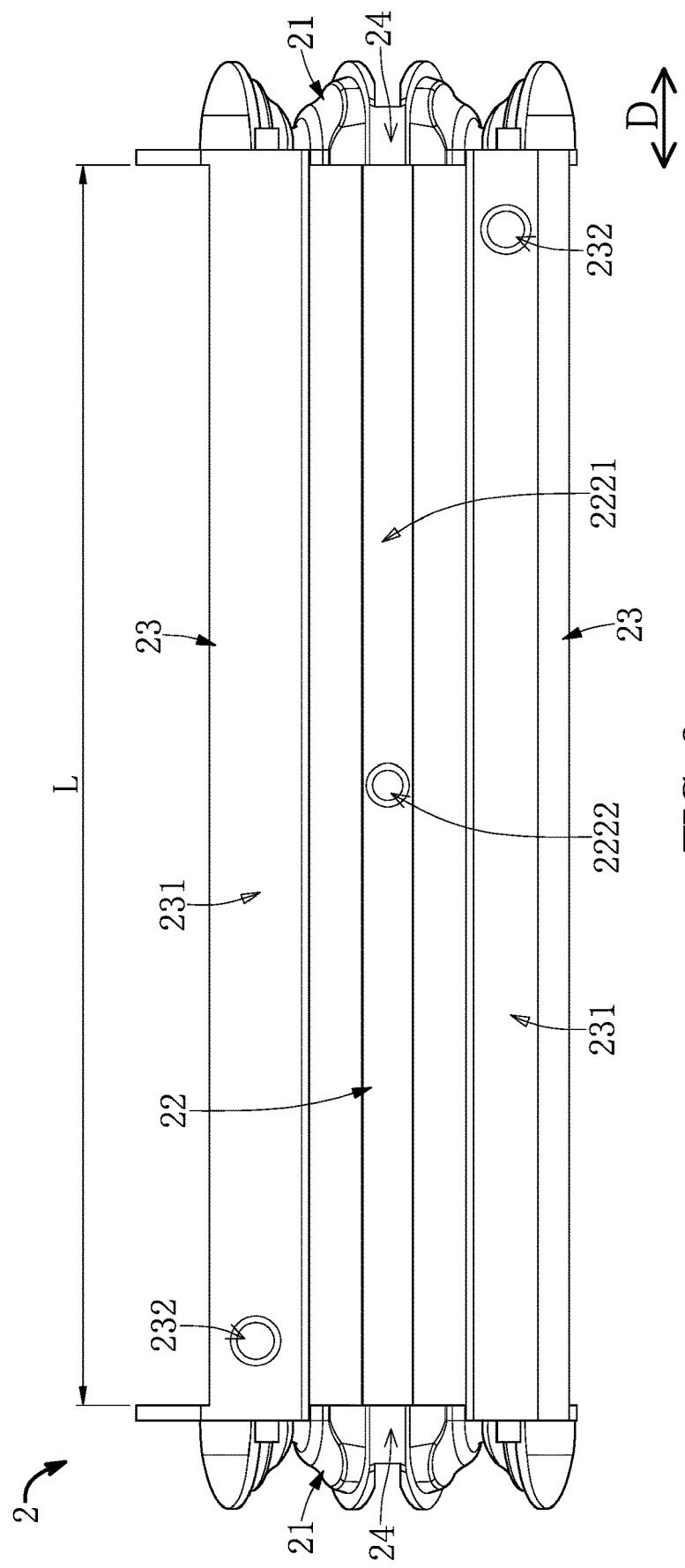
FIG. 8 is a planar view of FIG. 7.

As shown in FIG. 4 to FIG. 6, the sliding module 20 in the present embodiment includes a slider 1, two circulation seats 2 assembled to the slider 1, a plurality of rollers 3 (e.g., rolling balls), and a plurality of dustproof members 4 that are assembled to the slider 1 and that are abutted against the track 10. It should be noted that the two circulation seats 2 in the present embodiment are described in cooperation with the slider 1, the rollers 3, and the dustproof members 4, but the present disclosure is not limited thereto. For example, in other embodiments of the present disclosure not shown in the drawings, the circulation seat 2 can be independently used (e.g., sold) or can be used in cooperation with other components.

Moreover, the two end modules 30 are respectively assembled to two end surfaces 11 of the slider 1, so that the sliding module 20 and the two end modules 30 can jointly define a plurality of rolling paths P, and the rollers 3 are respectively movable along the rolling paths P. Each of the rolling paths P is a closed loop, and the rolling paths P respectively correspond in position to the two lateral surfaces 102. Furthermore, two ends of each of the dustproof members 4 are respectively fixed to the two end modules 30, and the dustproof members 4 are respectively abutted against the upper surface 101 and the two lateral surfaces 102 of the track 10, thereby isolating the rolling paths P from an external environment so as to achieve a dustproof effect.

The slider 1 in the present embodiment has an elongated shape, and the sliding direction D can be defined by a longitudinal direction of the slider 1. The slider 1 includes a base portion 12 and two lateral wing portions 13 that respectively extend from the base portion 12, and the two end surfaces 11 of the slider 1 are perpendicular to the sliding direction D. Moreover, an inner side of the base portion 12 faces toward the upper surface 101 of the track 10, and inner sides of the two lateral wing portions 13 respectively face toward the two lateral surfaces 102 of the track 10.

Each of the two circulation seats 2 is limited to having an inherently one-piece structure, so that any circulation seat formed by assembling more than one component is different from the circulation seat 2 described in the present embodiment. The two circulation seats 2 are respectively assembled to the two lateral wing portions 13 of the slider 1 and respectively correspond in position to the two lateral surfaces 102.

As the two circulation seats 2 in the present embodiment are of the substantially same structure or are in a mirror-symmetrical arrangement, the following description discloses the structure of just one of the two circulation seats 2 for the sake of brevity, but the present disclosure is not limited thereto. For example, in other embodiments of the present disclosure not shown in the drawings, the two circulation seats 2 can be of different structures.

As shown in FIG. 6 to FIG. 9, the circulation seat 2 in the present embodiment includes two turning portions 21, a middle retaining portion 22, and two lateral retaining portions 23. Each of the middle retaining portion 22 and the two lateral retaining portions 23 is connected to and arranged between the two turning portions 21. Each of the middle retaining portion 22 and the two lateral retaining portions 23 is parallel to the sliding direction D and has a length that is within a range from 20 mm to 175 mm, but the present disclosure is not limited thereto.

Specifically, the two turning portions 21 are respectively disposed on the two end surfaces 11 of the slider 1. In other words, each of the two end surfaces 11 of the slider 1 is provided with one of the two turning portions 21 of each of the two circulation seats 2 to be disposed thereon, so that each of the two end modules 30 covers one of the two turning portions 21 of each of the two circulation seats 2 (i.e., each of the two end modules 30 covers two of the turning portions 21 that are adjacent to each other and that respectively belong to the two circulation seats 2).

The middle retaining portion 22 is limited to having a two-stepped structure parallel to the sliding direction D. In other words, a structure of the middle retaining portion 22 in the present embodiment excludes a structure that is different from the two-stepped structure (e.g., a three-stepped structure), thereby facilitating two ends of the middle retaining portion 22 to be integrally connected to the two turning portions 21, respectively. Accordingly, the circulation seat 2 integrally formed as the single one-piece structure can be implemented.

The middle retaining portion 22 (or the two-stepped structure) in the present embodiment includes a connection bar 221 and a limiting bar 222 that is connected to the connection bar 221. The limiting bar 222 of the middle retaining portion 22 and any one of the two lateral retaining portions 23 respectively define two opposite sides of one of the rolling paths P, and can be further cooperated with the two turning portions 21 so as to enable the one of the rolling paths P to have the closed loop.

Moreover, each of the limiting bar 222 of the middle retaining portion 22 and the two lateral retaining portions 23 has an injection groove 2222, 232 formed on a boundary surface 2221, 231 adjacent to the track 10. The boundary surfaces 2221, 231 are parallel to each other, the boundary surfaces 231 of the two lateral retaining portions 23 are coplanar with each other, and the injection groove 2222 of the limiting bar 222 is spaced apart from the injection grooves 232 of the two lateral retaining portions 23 by a same distance, thereby enabling the circulation seat 2 to be integrally formed as the single one-piece structure.

Specifically, the connection bar 221 is connected to and arranged between the two turning portions 21, and a distance between two long lateral surfaces 2211 of the connection bar 221 gradually increases along a direction away from the limiting bar 222. The two long lateral surfaces 2211 of the connection bar 221 in the present embodiment have an arrangement angle σ221 therebetween that is within a range from 20 degrees to 45 degrees, thereby facilitating connection of two ends of the connection bar 221 to the two turning portions 21, respectively.

Figure 9:
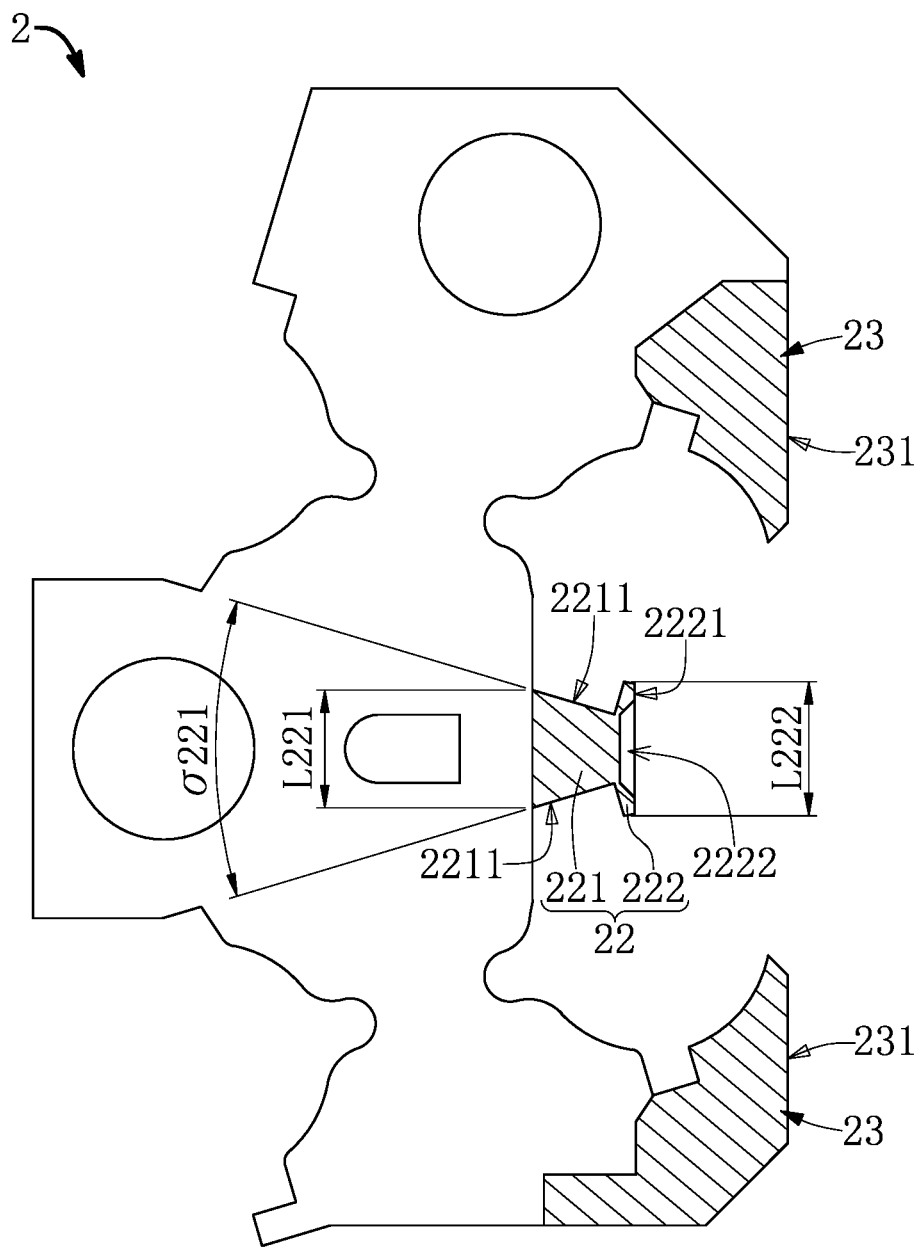
FIG. 9 is a cross-sectional view taken along line IX-IX of FIG. 7.
Figure 10:
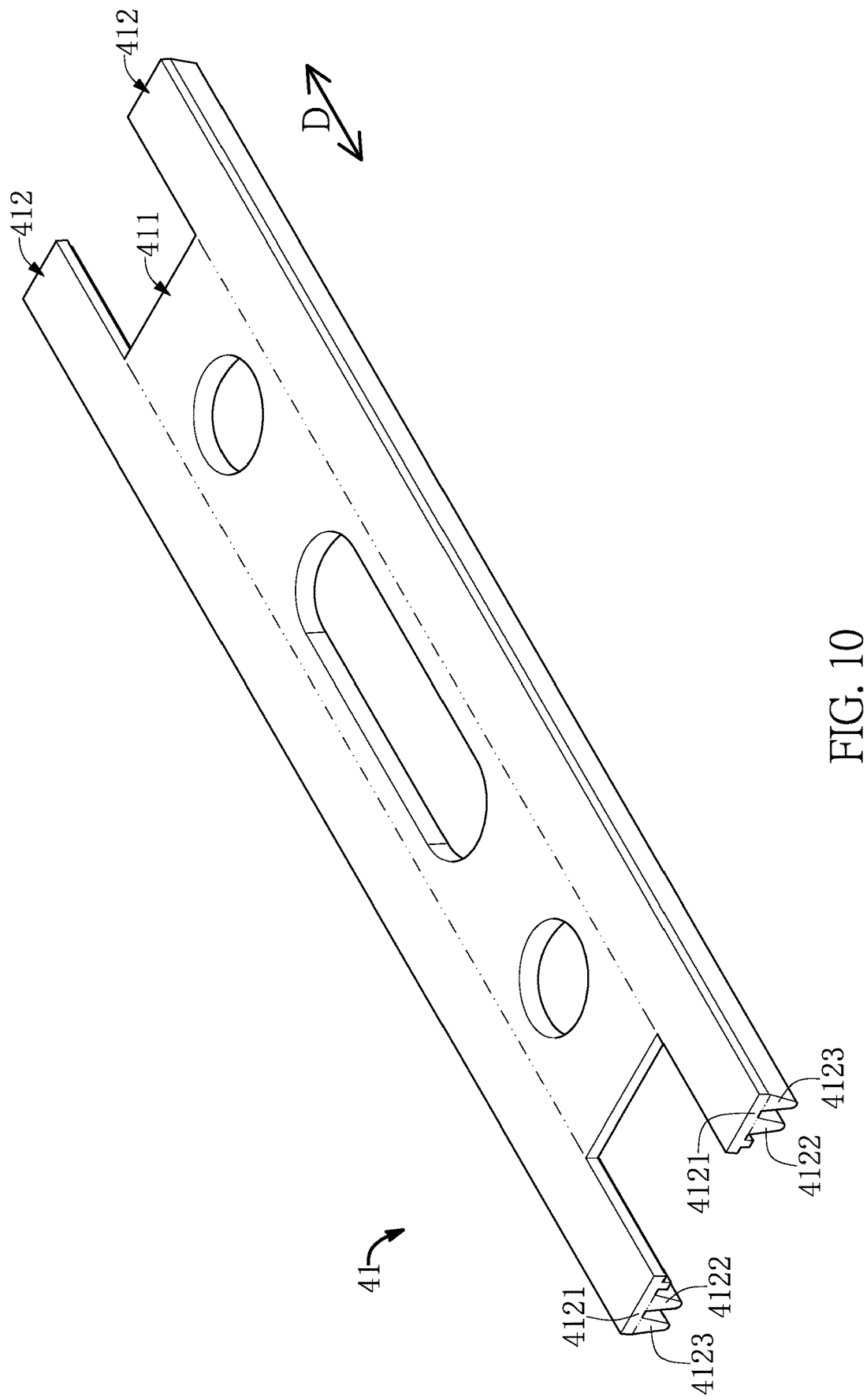
FIG. 10 is a perspective view showing an upper dustproof member of FIG. 6.

Moreover, in a cross section of the circulation seat 2 perpendicular to the sliding direction D (as shown in FIG. 9), the connection bar 221 has a trapezoidal cross section, and a bottom edge of the trapezoidal cross section has a length L221 that is within a range from 60% to 80% of a length L222 of the boundary surface 2221 of the limiting bar 222, but the present disclosure is not limited thereto.

Figure 3:
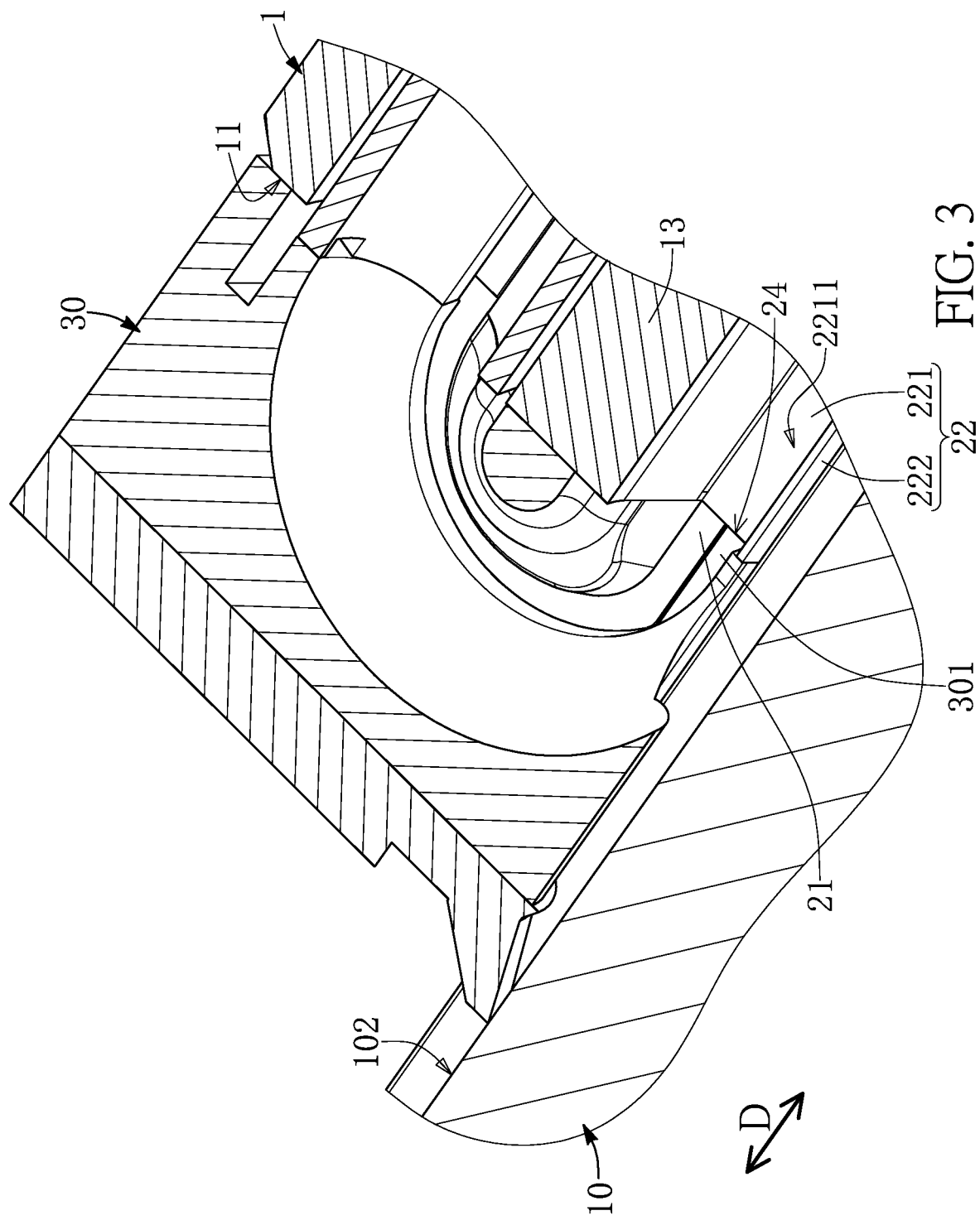
FIG. 3 is a partial enlarged view of FIG. 2 with rollers being omitted.

The above description describes the structure of the circulation seat 2, and the following description describes the connection relationship of the components of the sliding module 20, but the present disclosure is not limited thereto. As shown in FIG. 3 and FIG. 5, in each of the two circulation seats 2, the connection bar 221 and any one of the two turning portions 21 can jointly define a notch 24. Each of the two end modules 30 includes two mating blocks 301 each corresponding in shape to any one of the notches 24, and the mating blocks 301 of the two end modules 30 are respectively inserted into the notches 24 of the two circulation seats 2. Furthermore, ends of the two long lateral surfaces 2211 of the connection bar 221 can be coplanar with surfaces of the two turning portions 21 adjacent thereto and surfaces of the two mating blocks 301 adjacent thereto.

In summary, the circulation seat 2 provided by the present embodiment is integrally formed as the single one-piece structure, so that the notches 24 can be precisely manufactured for facilitating each of the notches 24 and the corresponding mating block 301 to be precisely cooperated with each other. Accordingly, issues related to assembling tolerances of the conventional middle retainer can be effectively avoided in the circulation seat 2 of the present embodiment.

As shown in FIG. 5 and FIG. 10 to FIG. 12, each of the dustproof members 4 in the present embodiment has an inherently one-piece structure (e.g., a rubber member), and two ends of each of the dustproof members 4 are detachably engaged with the two end modules 30, respectively, so that each of the dustproof members 4 can be assembled to the two end modules 30 without using any fixing component (e.g., a screw) for achieving rapid assembly. In addition, the cooperation structures of each of the dustproof members 4 and the two end modules 30 can be adjusted or changed according to design requirements, and are not limited by the drawings of the present embodiment.

Specifically, the dustproof members 4 include an upper dustproof member 41 and two lower dustproof members 42. The upper dustproof member 41 has a fixing segment 411 and two dustproof segments 412 that are respectively connected to two opposite sides of the fixing segment 411. Each of the fixing segment 411 and the two dustproof segments 412 is elongated and is parallel to the sliding direction D.

Each of the two dustproof segments 412 includes a carrying bar 4121, an inner rib 4122, and an outer rib 4123, the latter two of which are connected to the carrying bar 4121. Moreover, the carrying bar 4121, the inner rib 4122, and the outer rib 4123 of each of the two dustproof segments 412 are elongated and are parallel to the sliding direction D, and the outer ribs 4123 of the two dustproof segments 412 are respectively located at two opposite sides of the inner ribs 4122 of the two dustproof segments 412, but the present disclosure is not limited thereto.

It should be noted that as the two dustproof segments 412 in the present embodiment are mirror-symmetrical with respect to the fixing segment 411, the following description discloses the structure of just one of the two dustproof segments 412 for the sake of brevity, but the present disclosure is not limited thereto. For example, in other embodiments of the present disclosure not shown in the drawings, the two dustproof segments 412 can be of different structures.

In the present embodiment, inner side surfaces 41221, 41231 of the inner rib 4122 and the outer rib 4123 are arranged adjacent to each other and are parallel to the sliding direction D, and outer side surfaces 41222, 41232 of the inner rib 4122 and the outer rib 4123 are arranged away from each other and are parallel to the sliding direction D. Moreover, cross sections of the inner rib 4122 and the outer rib 4123 perpendicular to the sliding direction D are substantially the same, but the present disclosure is not limited thereto. For example, in other embodiments of the present disclosure not shown in the drawings, the cross sections of the inner rib 4122 and the outer rib 4123 perpendicular to the sliding direction D can be different from each other.

Figure 11:
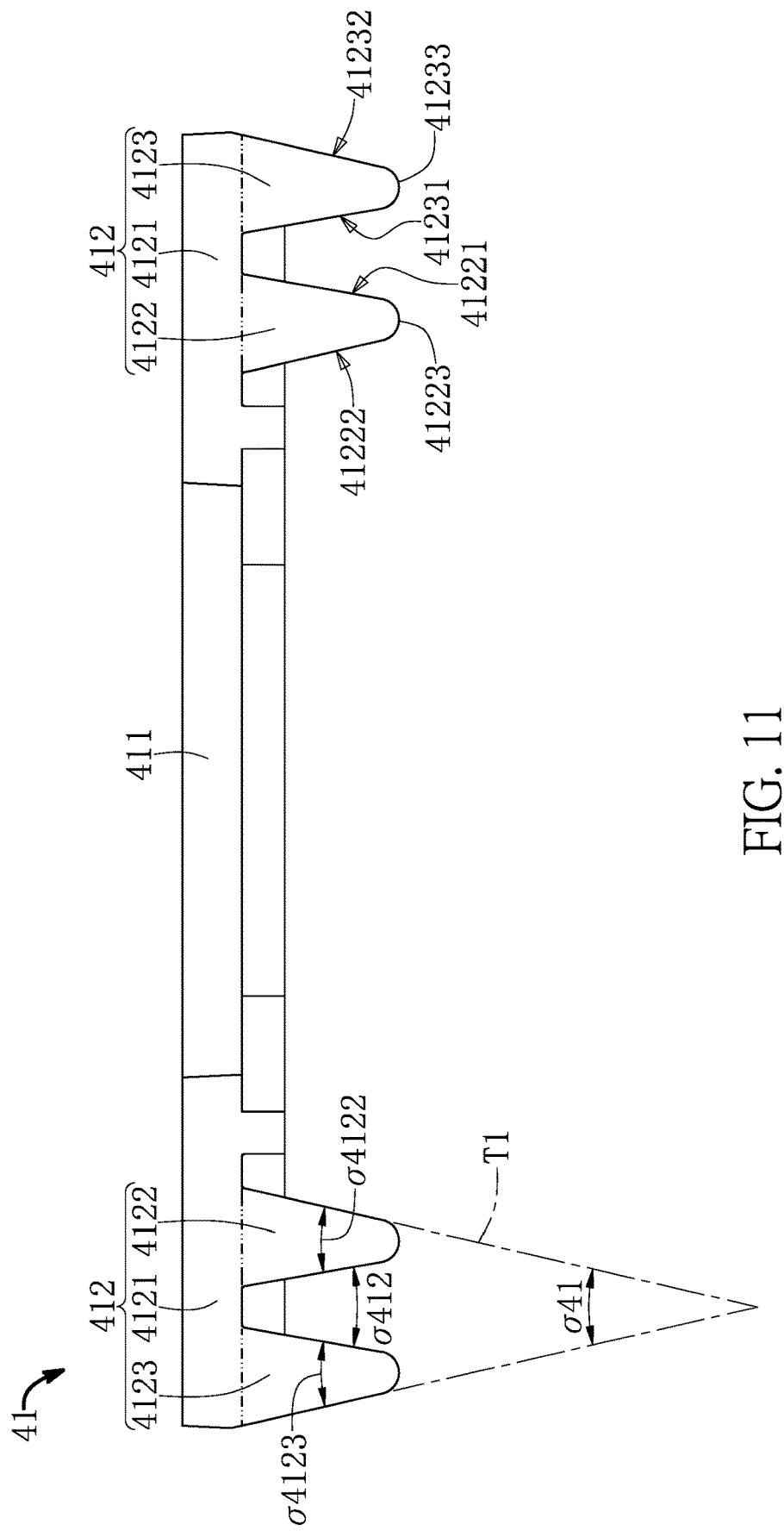
FIG. 11 is a planar view of FIG. 10.

Specifically, in a cross section of the dustproof segment 412 perpendicular to the sliding direction D (as shown in FIG. 11), the outer side surface 41222 of the inner rib 4122 and the outer side surface 41232 of the outer rib 4123 can virtually extend to form an isosceles triangle T1 having a top angle σ41 that is within a range from 10 degrees to 30 degrees. The top angle 641 is preferably within a range from 15 degrees to 25 degrees, but the present disclosure is not limited thereto.

Accordingly, in the dustproof segment 412 of the present embodiment, the outer side surface 41222 of the inner rib 4122 and the outer side surface 41232 of the outer rib 4123 can be designed to have a suitable structural condition through the isosceles triangle T1 and the top angle σ41, so that the inner rib 4122 and the outer rib 4123 can provide a better supporting force for enabling the inner rib 4122 and the outer rib 4123 to need only a relatively low interference with respect to the track 10.

Figure 12:
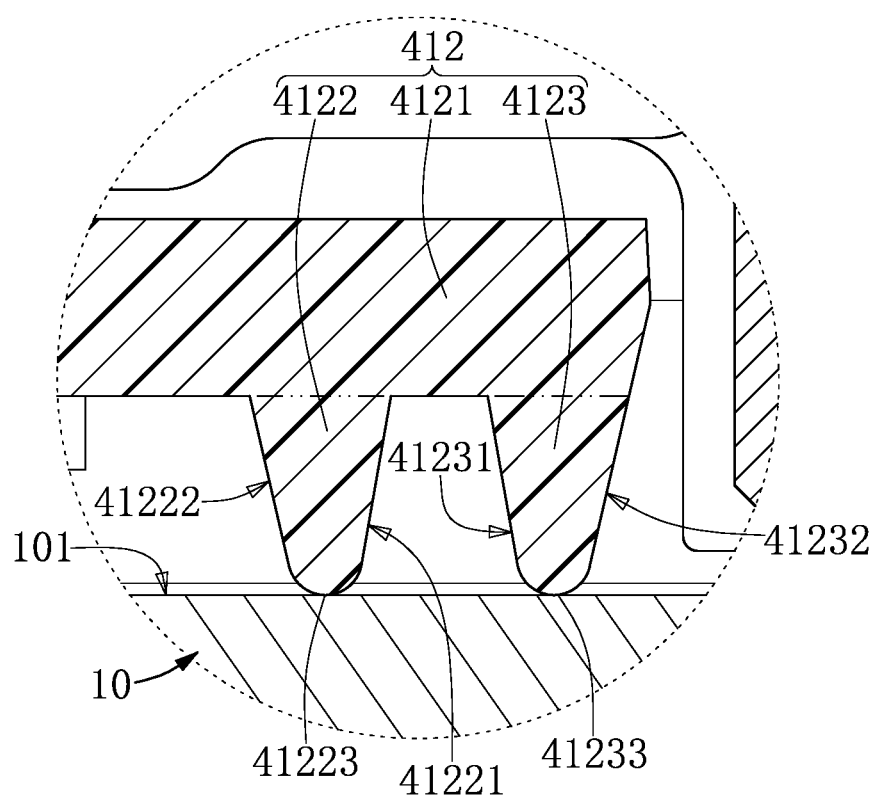
FIG. 12 is an enlarged view of part XII of FIG. 4.
Figure 13:
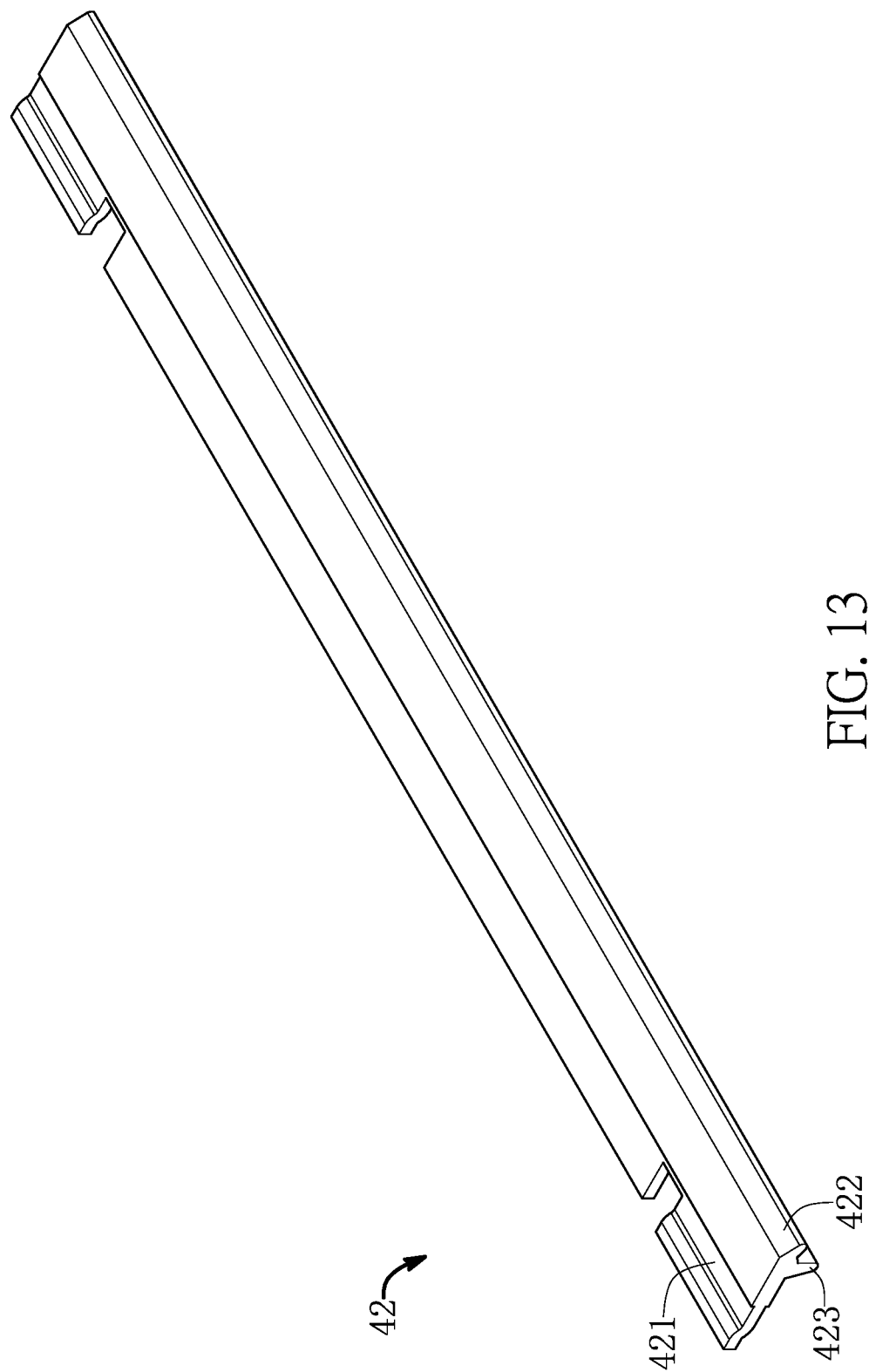
FIG. 13 is a perspective view showing a lower dustproof member of FIG. 6.

As shown in FIG. 4, FIG. 11, and FIG. 12, a free end edge 41223 of the inner rib 4122 (e.g., a junction of the inner side surface 41221 and the outer side surface 41222) is abutted against the upper surface 101 of the track 10 so as to form an inner interference distance within a range from 0 mm to 0.05 mm. Moreover, a free end edge 41233 of the outer rib 4123 (e.g., a junction of the inner side surface 41231 and the outer side surface 41232) is abutted against the upper surface 101 of the track 10 so as to form an outer interference distance that is greater than the inner interference distance. The outer interference distance is preferably within a range from 0.05 mm to 0.1 mm, but the present disclosure is not limited thereto.

In the dustproof segment 412 of the present embodiment, a deformation of the inner rib 4122 with respect to the track 10 can be reduced to approach zero through the above structural design of the inner rib 4122 and the outer rib 4123, thereby preventing dust or particles from slipping into an interface between the inner rib 4122 and the upper surface 101 of the track 10. Accordingly, the inner rib 4122 can be maintained to be gaplessly abutted against the upper surface 101 of the track 10 for increasing the dustproof effect.

As shown in FIG. 11, in the cross section of any one of the two dustproof segments 412, the inner side surface 41221 of the inner rib 4122 and the inner side surface 41231 of the outer rib 4123 have an angle σ412 therebetween within a range from 10 degrees to 30 degrees, the inner rib 4122 has an isosceles triangle having a top angle σ4122 that is within a range from 10 degrees to 30 degrees, and the outer rib 4123 has an isosceles triangle having a top angle σ4123 that is within a range from 10 degrees to 30 degrees.

The above description describes the upper dustproof member 41, and the following description describes the two lower dustproof members 42. As shown in FIG. 4 and FIG. 13 to FIG. 15, the two lower dustproof members 42 are respectively abutted against the two lateral surfaces 102 of the track 10.

It should be noted that as the two lower dustproof members 42 in the present embodiment are in a mirror-symmetrical arrangement, the following description discloses the structure of just one of the two lower dustproof members 42 for the sake of brevity, but the present disclosure is not limited thereto. For example, in other embodiments of the present disclosure not shown in the drawings, the two lower dustproof members 42 can be of different structures.

Specifically, the lower dustproof member 42 includes an assembling segment 421, an upper rib 422 connected to the assembling segment 421, a lower rib 423 connected to the assembling segment 421, and a reinforced rib 424 that is connected to the upper rib 422 and the lower rib 423. Each of the assembling segment 421, the upper rib 422, the lower rib 423, and the reinforced rib 424 is elongated and is parallel to the sliding direction D. In other words, the assembling segment 421, the upper rib 422, the lower rib 423, and the reinforced rib 424 are parallel to each other.

Moreover, each of the upper rib 422 and the lower rib 423 has an inner surface 4221, 4231 and an outer surface 4222, 4232 that is opposite to the inner surface 4221, 4231. The inner surface 4221 of the upper rib 422 is spaced apart from and arranged adjacent to the inner surface 4231 of the lower rib 423. The reinforced rib 424 is integrally connected to the inner surface 4221 of the upper rib 422 and the inner surface 4231 of the lower rib 423 so as to jointly define a substantially trapezoidal space that is parallel to the sliding direction D.

In the present embodiment, cross sections of the upper rib 422 and the lower rib 423 perpendicular to the sliding direction D are substantially the same, but the present disclosure is not limited thereto. For example, in other embodiments of the present disclosure not shown in the drawings, the cross sections of the upper rib 422 and the lower rib 423 perpendicular to the sliding direction D can be different from each other.

Figure 14:
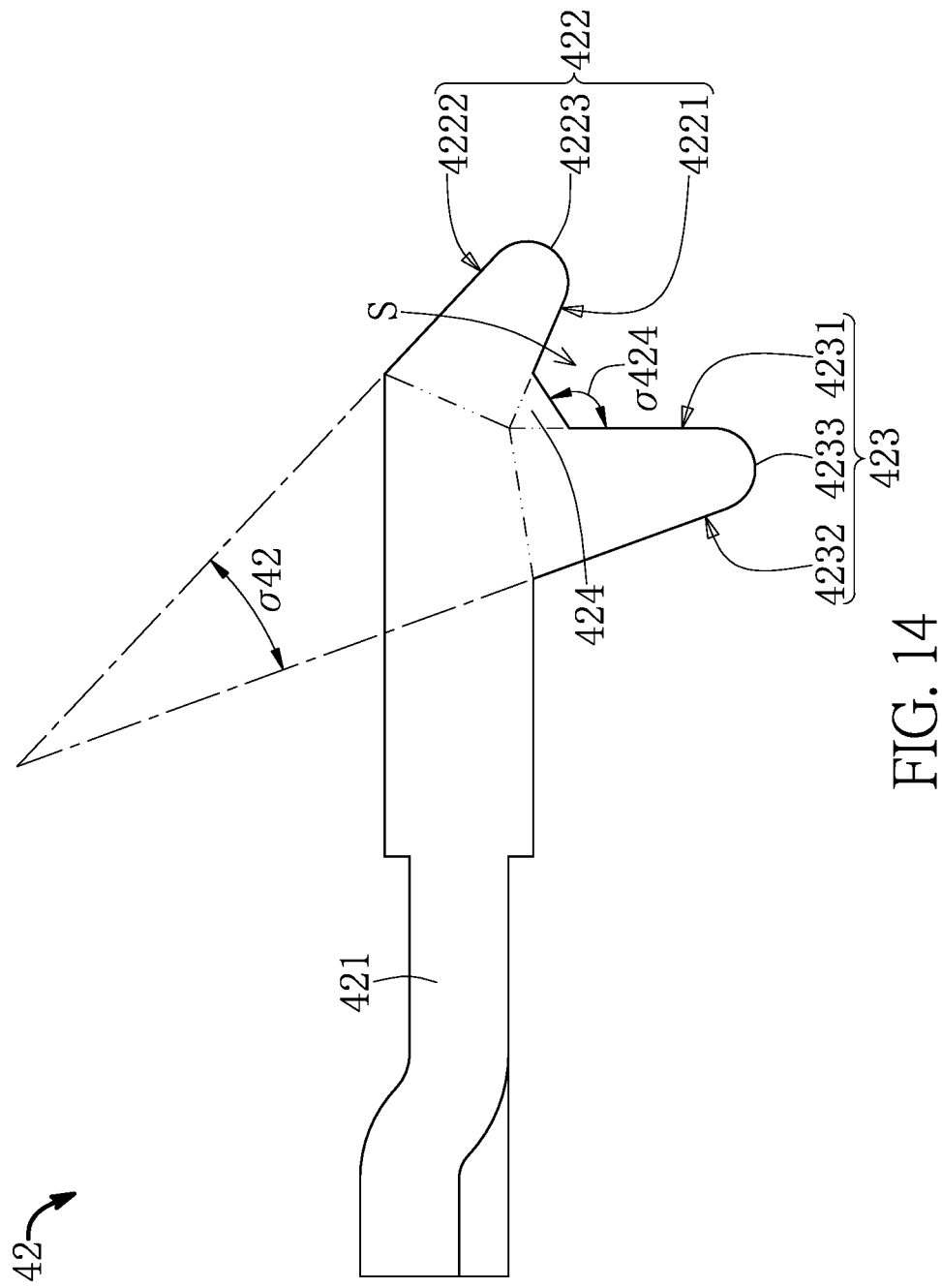
FIG. 14 is a planar view of FIG. 13.
Figure 15:
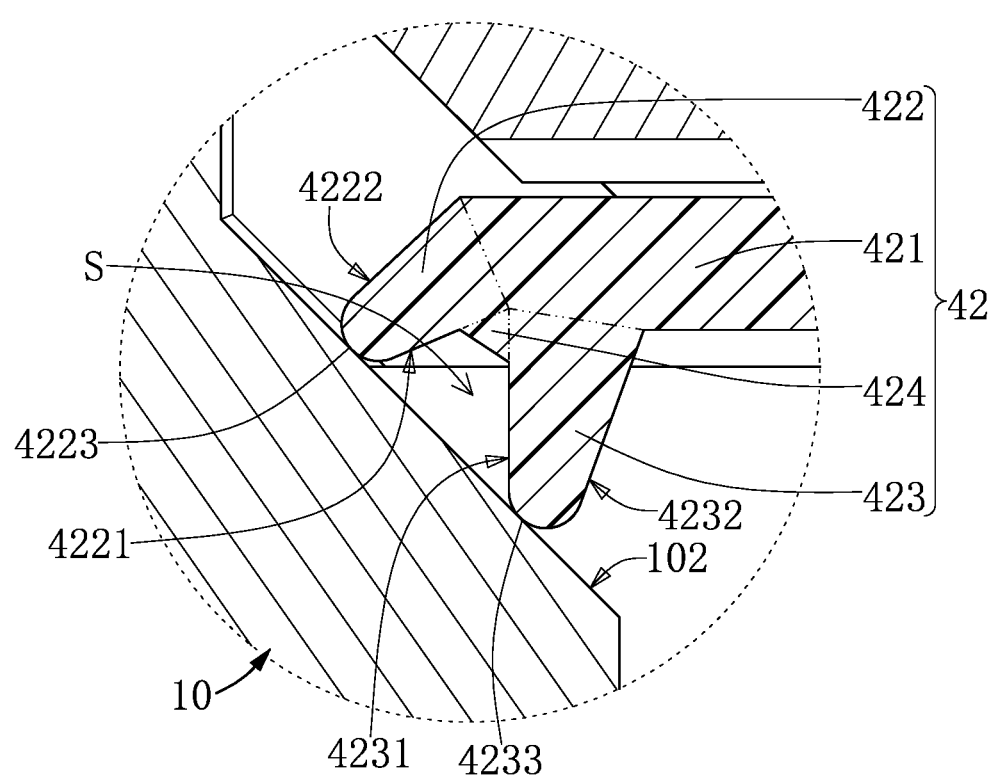
FIG. 15 is an enlarged view of part XV of FIG. 4.

Specifically, in a cross section of any one of the lower dustproof members 42 perpendicular to the sliding direction D (as shown in FIG. 14), the outer surface 4222 of the upper rib 422 and the outer surface 4232 of the lower rib 423 can virtually extend to form an acute angle σ42 within a range from 15 degrees to 25 degrees, and an angle σ424 between the reinforced rib 424 and the inner surface 4231 of the lower rib 423 is preferably within a range from 110 degrees to 150 degrees.

Accordingly, in the lower dustproof member 42 of the present embodiment, the outer surface 4222 of the upper rib 422 and the outer surface 4232 of the lower rib 423 can be designed to have a suitable structural condition through the specific range of the acute angle σ42, so that the upper rib 422 and the lower rib 423 can provide a better supporting force for enabling the upper rib 422 and the lower rib 423 to need only a relatively low interference with respect to the track 10.

Specifically, in each of the two lower dustproof members 42, a free end edge 4223 of the upper rib 422 (e.g., a junction of the inner surface 4221 and the outer surface 4222) is abutted against the corresponding lateral surface 102 of the track 10 so as to form an upper interference distance within a range from 0 mm to 0.05 mm. Moreover, a free end edge 4233 of the lower rib 423 (e.g., a junction of the inner surface 4231 and the outer surface 4232) is abutted against the corresponding lateral surface 102 of the track 10 so as to form a lower interference distance within a range from 0 mm to 0.05 mm.

In the lower dustproof member 42 of the present embodiment, a deformation of any one of the upper rib 422 and the lower rib 423 with respect to the track 10 can be reduced to approach zero through the above structural design of the upper rib 422 and the lower rib 423, thereby preventing dust or particle from slipping into an interface between the upper rib 422 (or the lower rib 423) and the corresponding lateral surface 102 of the track 10. Accordingly, the upper rib 422 (or the lower rib 423) can be maintained to be gaplessly abutted against the corresponding lateral surface 102 of the track 10 for increasing the dustproof effect.

Beneficial Effects of the Embodiments

In conclusion, in any one of the linear guideway, the sliding module, and the circulation seat provided by the present embodiment of the present disclosure, the circulation seat can be integrally formed as a single one-piece structure through the structural design of the middle retaining portion (e.g., the middle retaining portion is the two-stepped structure, and a distance between two long lateral surfaces of the connection bar gradually increases along a direction away from the limiting bar), thereby effectively avoiding problems associated with the middle retainer of the conventional linear guideway (e.g., the problems related to alignment accuracy requirements, assembling tolerances, and stress concentration due to rotation).

Moreover, in the linear guideway provided by the present embodiment of the present disclosure, the circulation seat is formed with the above specific structural design, e.g., the arrangement angle being within a range from 20 degrees to 45 degrees, the injection groove of the limiting bar being spaced apart from the injection grooves of the two lateral retaining portions by the same distance, and the length of the bottom edge of the trapezoidal cross section of the connection bar being 60% to 80% of the length of the boundary surface of the limiting bar, thereby enabling the circulation seat to be integrally formed as the single one-piece structure in a stable manner.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A linear guideway, comprising:
a track having two lateral surfaces respectively arranged on two opposite sides thereof;
a sliding module slidably disposed on the track along a sliding direction, wherein the sliding module has two end surfaces and includes:
a slider having a base portion and two lateral wing portions that respectively extend from the base portion, wherein inner sides of the two lateral wing portions respectively face toward the two lateral surfaces; and
two circulation seats each having an one-piece structure, wherein the two circulation seats are respectively assembled to the two lateral wing portions and respectively correspond in position to the two lateral surfaces, and wherein each of the two circulation seats includes:
two turning portions respectively disposed on the two end surfaces of the slider;
a middle retaining portion having a two-stepped structure parallel to the sliding direction, wherein the two-stepped structure includes a connection bar and a limiting bar that is connected to the connection bar, and wherein the connection bar is connected to and arranged between the two turning portions, and a distance between two lateral surfaces of the connection bar increases along a direction away from the limiting bar; and
two lateral retaining portions connected to and arranged between the two turning portions, wherein the two lateral retaining portions are respectively located at two opposite sides of the middle retaining portion; and
two end modules respectively assembled to the two end surfaces of the slider, wherein each of the two end modules covers one of the two turning portions of each of the two circulation seats, and the two end modules are slidably disposed on the track,
wherein, in each of the two circulation seats, each of the limiting bar of the middle retaining portion and the two lateral retaining portions has an injection groove formed on a boundary surface adjacent to the track, and the injection groove of the limiting bar is spaced apart from the injection groove of each of the two lateral retaining portions by a same distance.

2. The linear guideway according to claim 1, wherein, in each of the two circulation seats, the two lateral surfaces of the connection bar have an arrangement angle therebetween that is within a range from 20 degrees to 45 degrees.

3. The linear guideway according to claim 1, wherein, in each of the two circulation seats, any one of a length of the middle retaining portion and a length of each of the two lateral retaining portions is within a range from 20 mm to 175 mm.

4. The linear guideway according to claim 1, wherein, in a cross section of each of the two circulation seats taken along a direction perpendicular to the sliding direction, the connection bar has a trapezoidal cross section, and a bottom edge of the trapezoidal cross section has a length that is within a range from 60% to 80% of a length of the boundary surface of the limiting bar.

5. The linear guideway according to claim 1, wherein, in each of the two circulation seats, the connection bar and any one of the two turning portions jointly define a notch, wherein each of the two end modules includes two mating blocks each corresponding in shape to any one of the notches of the two circulation seats, and wherein the mating blocks of the two end modules are respectively inserted into the notches of the two circulation seats.

6. The linear guideway according to claim 5, wherein, in each of the two circulation seats, ends of the two lateral surfaces of the connection bar are coplanar with surfaces of the two turning portions adjacent thereto and surfaces of the two mating blocks adjacent thereto.

7. The linear guideway according to claim 1, wherein the sliding module and the two end modules jointly define a plurality of rolling paths, and the sliding module includes a plurality of rollers that are respectively movable along the rolling paths, and wherein, in each of the two circulation seats, the limiting bar of the middle retaining portion and any one of the two lateral retaining portions respectively define two opposite sides of one of the rolling paths.

8. A sliding module of a linear guideway, comprising:
- a slider having a base portion and two lateral wing portions that respectively extend from the base portion, wherein inner sides of the two lateral wing portions face toward each other, and wherein the slider has two end surfaces; and
- two circulation seats each having an one-piece structure, wherein the two circulation seats are respectively assembled to the two lateral wing portions, and wherein each of the two circulation seats includes:
  - two turning portions respectively disposed on the two end surfaces of the slider;
  - a middle retaining portion having a two-stepped structure, wherein the two-stepped structure includes a connection bar and a limiting bar that is connected to the connection bar, and wherein the connection bar is connected to and arranged between the two turning portions, and a distance between two lateral surfaces of the connection bar increases along a direction away from the limiting bar; and
  - two lateral retaining portions connected to and arranged between the two turning portions, wherein the two lateral retaining portions are respectively located at two opposite sides of the middle retaining portion;

wherein, in each of the two circulation seats, each of the limiting bar of the middle retaining portion and the two lateral retaining portions has an injection groove formed on a boundary surface adjacent to the track, and the injection groove of the limiting bar is spaced apart from the injection groove of each of the two lateral retaining portions by a same distance.

9. A circulation seat of a linear guideway having an one-piece structure, comprising:
- two turning portions;
- a middle retaining portion having a two-stepped structure, wherein the two-stepped structure includes a connection bar and a limiting bar that is connected to the connection bar, and wherein the connection bar is connected to and arranged between the two turning portions, and a distance between two lateral surfaces of the connection bar increases along a direction away from the limiting bar; and
- two lateral retaining portions connected to and arranged between the two turning portions, wherein the two lateral retaining portions are respectively located at two opposite sides of the middle retaining portion;

wherein each of the limiting bar of the middle retaining portion and the two lateral retaining portions has an injection groove formed on a boundary surface adjacent to the track, and the injection groove of the limiting bar is spaced apart from the injection groove of each of the two lateral retaining portions by a same distance.

* * * * *